United States Patent [19]

Wawro et al.

[11] Patent Number: 4,465,499
[45] Date of Patent: Aug. 14, 1984

[54] ASSEMBLY FOR SECURING FILTER CHANNELS TO SUPPORT STRUCTURE IN A CASING SUCH AS THE HOUSING OF AN AIR HANDLING UNIT AND FOR SELECTIVELY PROVIDING FLANGES FOR SECURING A DUCT TO THE CASING

[75] Inventors: Thaddeus J. Wawro, Auburn; Timothy A. Wright, Chittenango, both of N.Y.

[73] Assignee: Carrier Corporation, Syracuse, N.Y.

[21] Appl. No.: 412,674

[22] Filed: Aug. 30, 1982

[51] Int. Cl.³ .............................................. B01D 46/10
[52] U.S. Cl. ...................................... 55/481; 55/269; 55/506; 55/508; 55/412
[58] Field of Search .................. 55/149, 481, 493, 496, 55/506, 508, 411, 412, 422, 269; 210/454, 463, 477; 160/323 B

[56] References Cited

U.S. PATENT DOCUMENTS

| | | |
|---|---|---|
| 1,984,135 | 12/1934 | Houston . |
| 2,062,649 | 12/1936 | Hegan . |
| 2,175,195 | 10/1939 | Irvine . |
| 2,478,006 | 6/1949 | Campbell et al. ...................... 55/481 |
| 2,665,627 | 1/1954 | Fager ...................................... 55/496 |
| 3,273,327 | 9/1966 | Hoffman . |
| 3,274,759 | 9/1966 | Bell, Jr. .................................. 55/496 |
| 3,430,771 | 3/1969 | Dreher . |
| 3,520,111 | 7/1970 | Revell et al. ........................... 55/481 |
| 3,755,995 | 9/1973 | Stickel . |
| 3,782,082 | 1/1974 | Smith et al. . |
| 3,823,533 | 7/1974 | Alverson et al. . |
| 4,021,212 | 5/1977 | Legler . |
| 4,217,121 | 8/1980 | Fichter .................................. 55/506 |

Primary Examiner—David L. Lacey
Attorney, Agent, or Firm—David J. Zobkiw

[57] ABSTRACT

An assembly is provided for securing a pair of filter supports to support structure defined by the casing of an air handling unit and for selectively providing flanges for securing a duct to the casing. The filter support includes a filter channel having a channel portion for securing a filter and having a flange portion. The filter support may be mounted in a first position with the flange portion not extending beyond the end of the unit and in a second position with the flange portion extending beyond the end of the unit for promoting connections to a duct. Additionally, duct angles are provided having flanges extending therefrom. The duct angles are mounted to have the flanges extend inwardly when the filter channel does not extend beyond the unit and are mounted to extend outwardly to coact with the flange portions of the filter channels when it is desired to connect a duct to the unit.

4 Claims, 7 Drawing Figures

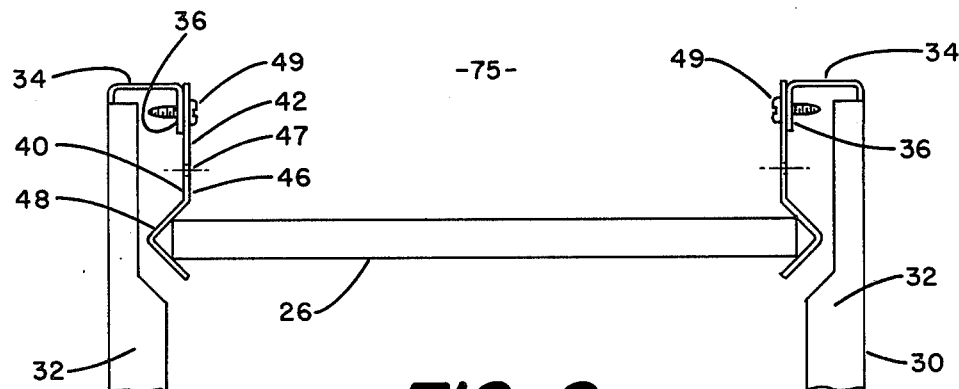
FIG. 2
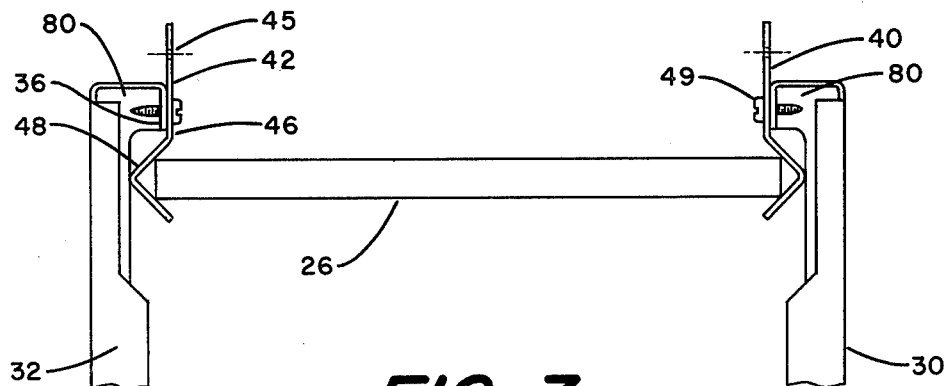
FIG. 3
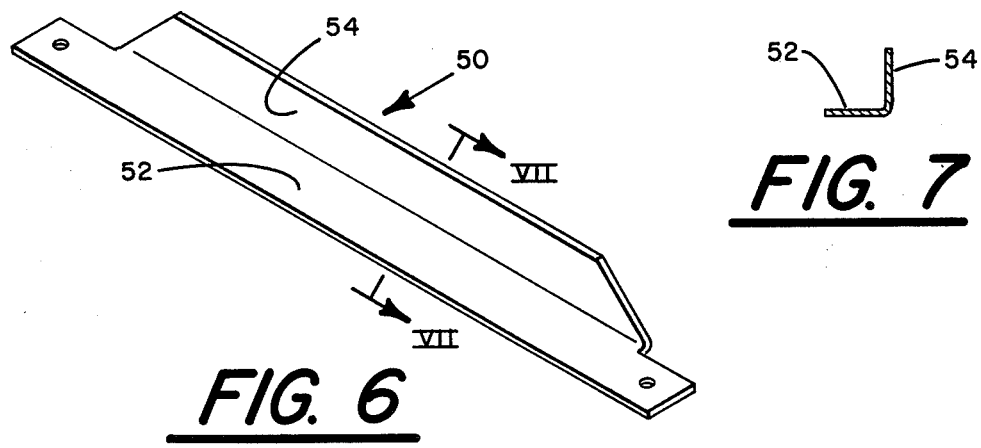
FIG. 6
FIG. 7

ASSEMBLY FOR SECURING FILTER CHANNELS TO SUPPORT STRUCTURE IN A CASING SUCH AS THE HOUSING OF AN AIR HANDLING UNIT AND FOR SELECTIVELY PROVIDING FLANGES FOR SECURING A DUCT TO THE CASING

BACKGROUND OF THE INVENTION

1. Field of the Invention

This invention relates to an assembly for securing a filter and for providing selectively extending flanges for connection to a duct. More particularly, the present invention is directed to an assembly including means for mounting filter channels for securing a filter in multiple positions, said filter channels extending from the unit to also act as duct flanges in at least one position.

2. Description of the Prior Art

An air handling unit as may be used in an air conditioning or refrigeration application is typically designed to have a heat exchanger and a fan for circulating the air to be conditioned in heat exchange relation with the heat exchanger. An indoor unit for an air conditioning system typically includes a refrigerant to air heat exchanger which will serve as an evaporator when the air conditioning unit is operated to supply cooling and as a condenser if the air conditioning unit is being operated as a heat pump to supply heat energy to the enclosure. Additionally, a squirrel cage type fan is typically mounted within the unit for drawing air through or blowing air over the heat exchanger. An additional heat source such as electric resistance heaters may be provided as part of the unit.

In a residential application this indoor unit will make up the portion of the air conditioning unit within the enclosure. The remainder of the air conditioning unit, typically the condenser or outdoor coil and compressor unit are located exterior of the residence.

The air handling unit is often designed such that it may be mounted in either a horizontal or a vertical position. It is further designed such that air flow may be up or down through the unit depending upon the enclosure and design chosen. Additionally, the air handling unit is typically connected to apparatus for circulating air to the enclosure. A duct system typically includes a series of passageway defining members for directing conditioned air throughout the enclosure. A duct may be connected directly to the unit for receiving or directing air flow to the enclosure from the unit.

Air handling units may also typically include a filter for screening unwanted particulates from the air flow path. Additionally, the unit may include an adapter having outwardly extending flange portions such that the duct may be attached to the flange portions to provide an air flow path between the duct system and the air handling unit. This transition assembly has typically been formed from sheet metal parts incorporating numerous surfaces and bends and has been a relatively expensive part to produce. The apparatus as described herein includes a pair of filter channels having a channel portion for securing a filter. The filter channels additionally include flange portions which, depending upon the mounting position of the filter channel, may extend outwardly to engage duct work from the enclosure. Additionally, duct angles may be provided for defining additional flanges if necessary.

SUMMARY OF THE INVENTION

It is an object of the present invention to provide a filter support for an air handling unit.

It is a further object of the present invention to provide an assembly for both securing a filter across the air flow stream and for selectively providing duct flanges for securing a duct thereto.

It is another object of the present invention to provide an assembly which may be mounted in a first position during factory assembly and may be placed in a second position in the field for promoting duct attachment thereto.

It is another object of the invention to provide an assembly having few parts which may serve multiple functions.

It is another object of the present invention to provide a safe, economical, reliable and easy to assemble filter support for an air handling unit.

It is a further object of the present invention to provide flange extensions as a portion of the filter support assembly of an air handling unit.

Other objects will be apparent from the description to follow and the appended claims.

These and other objects are achieved in accordance with the preferred embodiment of the present invention wherein there is provided an assembly for both securing a filter across an air flow stream defined by a structure including sidewalls and for selectively providing duct flanges for securing a duct thereto. A support portion of the structure extends inwardly from the side walls defining an air flow passageway and a pair of filter channels are positioned on opposite sides of the air flow stream, each filter channel including a flange portion and a channel portion for the sliding receipt of the filter. Means to secure the filter channels to the support portion in a first position wherein the flange portion does not extend outwardly beyond the support portion and in a second position wherein the flange portion extends beyond the support portion whereby a duct receiving flange is extended are further provided.

An air handling unit for use in an air conditioning system is further disclosed. The air handling unit includes a casing defining an air flow path therethrough, said casing including a top portion defining an end of the unit and an air flow passageway therethrough and a support portion extending inwardly from the top portion and further defining the air flow passageway. A pair of filter channels are mounted to the support portion of the casing on opposite sides of the air flow passageway, said filter channels each having a flange portion and a channel portion. A filter is secured across the passageway for the air flow path defined by the casing, said filter being slidably received for insertion and removal in the channel portions of the filter channels.

BRIEF DESCRIPTION OF THE DRAWINGS

FIG. 2 is a sectional view of the combination filter support and flange assembly with the filter channels being in the shipping position.

FIG. 3 is a sectional view of the combination filter support and flange assembly with the filter channels being in the duct connecting position.

FIG. 6 is an isometric view of a duct angle.

FIG. 7 is a sectional view taken along line VII—VII of the duct angle of FIG. 6.

DESCRIPTION OF THE PREFERRED EMBODIMENT

The embodiment hereafter described will refer to an indoor unit for use in an air conditioning system. It is to be understood that the combined filter support and flange assembly would have like applicability in any cabinet type device wherein it is desired to hold a filter element and to provide flanges for promoting connections to a duct. It is further to be understood that filter as used herein refers to a device for screening out unwanted contents in an air flow stream. Within this broad sense not only a simple mechanical device but other devices such as electronic air cleaners or electrostatic precipitators could also be secured therein.

Figure 1:
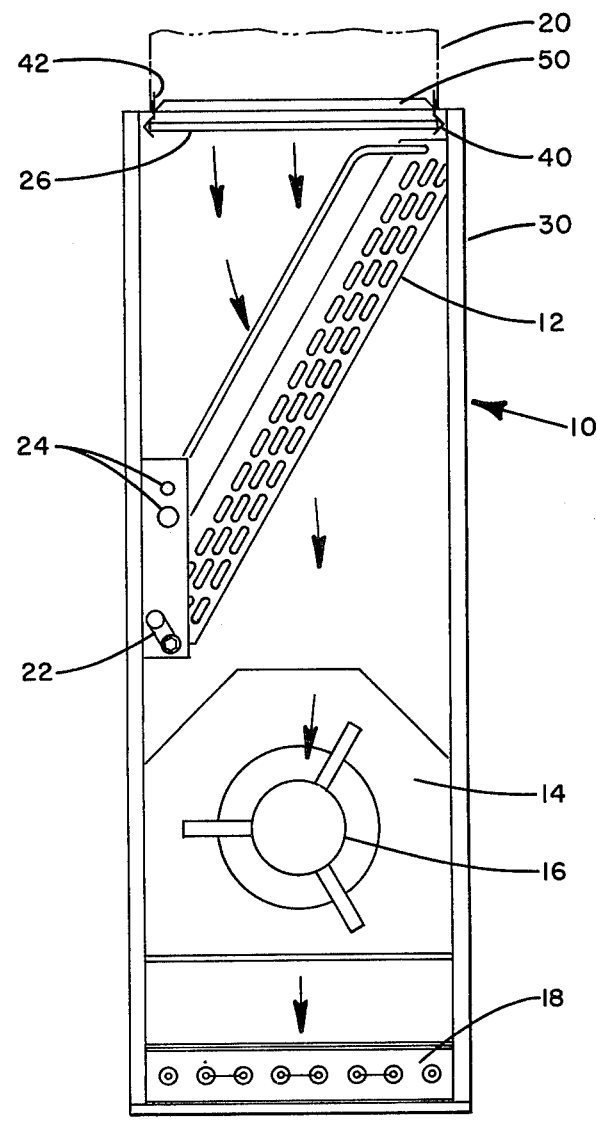
FIG. 1 is a partially cut away side view of an air handling unit with attached duct.

Referring to FIG. 1 there can be seen air handling unit 10. Air handling unit 10 is defined by unit casing or housing 30 forming two side walls and a rear wall. Filter 26 is shown mounted within the air handling unit. A cabinet cover, not shown, is placed over the front of the unit to complete the enclosure. A separate filter cover may be placed over the area where filter 26 is located such that only the filter cover need be removed for changing or cleaning filter 26. Located within air handling unit 10 is heat exchanger 12. The heat exchanger is mounted diagonally across the air flow path. Condensate drain connections 22 and, suction and discharge refrigerant line connections 24 are shown located adjacent the lower end of the heat exchanger. Fan scroll 14 is shown towards the bottom of the unit having fan motor 16 mounted thereto and having a squirrel cage fan (not shown) for drawing air through the heat exchanger and discharging said air downwardly through the bottom of the air handling unit. Electric resistance heaters 18 are shown at the very bottom of the unit for adding heat energy to the air flow stream.

Figure 4:
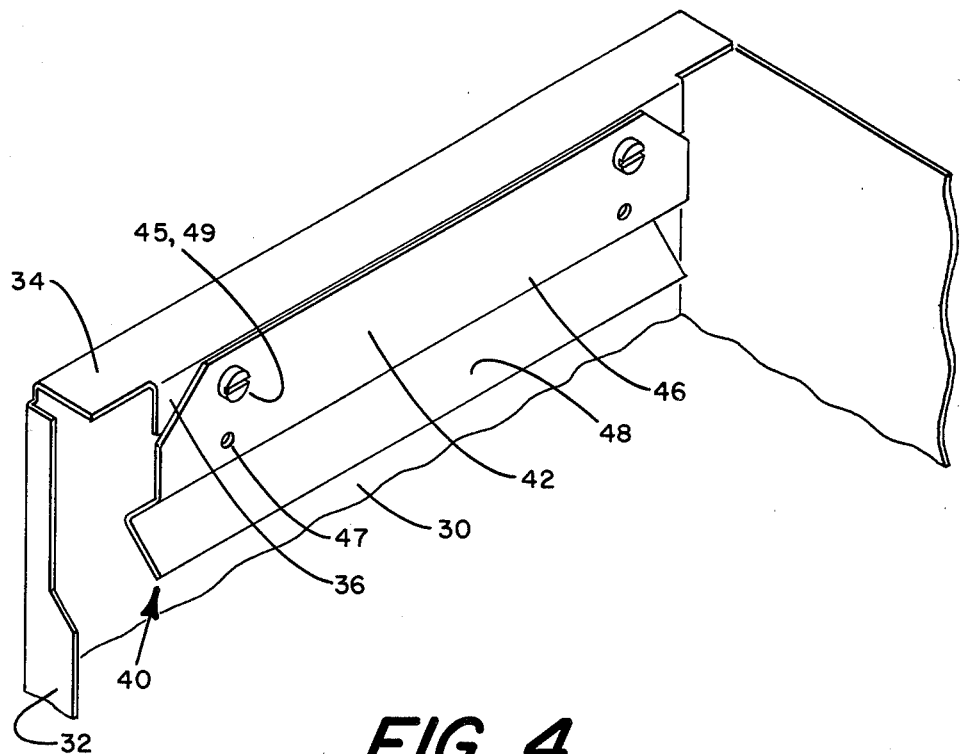
FIG. 4 is an isometric view of a portion of the unit casing and filter channel assembly.

Toward the top of the unit 10, as best shown in FIGS. 2-4, it may be seen that the unit casing 30 is bent perpendicular to the side walls 32 to form top portions 34 and then bent again to form small support portions 36 parallel to the side walls 32. Filter channels 40 are mounted to the support portions 36 which are those portions parallel to the side walls 32. Filter channel 40 includes a channel portion for the receipt of filter 26 and flange portions 42. Filter channel 40 is shown mounted in a position wherein flange portions 42 extend upwardly for engagement with duct 20. Additionally, duct angle 50 is shown extending across the front of the unit with an angle portion extending upwardly for the receipt of the duct.

Referring more specifically to FIGS. 2 and 3, the arrangement of the filter channel in combination with the unit casing is shown in more explicit detail. FIG. 2 shows the arrangement of the unit with the filter channels 40 in the support position as would be assembled in the factory. In this position, it may be seen that unit casing 30 includes front portions or walls 32, top portions 34 defining the end of the unit and defining air flow passageway 75 therebetween and support portions 36 extending downwardly and inwardly from the top portions 34 parallel to the side walls 32 and further defining air flow passageway 75. It is contemplated that this top structure will extend across either both sides of the unit or around three sides of the unit leaving only the open front which is covered by the cabinet cover (not shown) and which may be covered by duct angle 50. In the shipping position, as shown in FIG. 2, the ends of filter channels 40 do not extend beyond top portion 34 defining the end of the unit. It may further be seen in FIG. 2 that filter channel 40 has several portions including flange portion 42, extension portion 46 and channel portion 48. Within flange portion 42 there is provided flange opening 45 and within extension portion 46 is provided extension opening 47. Fasteners 49 are shown extending through the flange openings in FIG. 2 to secure the filter channels to support portions 36. In this position the fastener acts to secure the filter channels and support the filter in the internal position as shown. Channel portion 48 having both outward and inward angled sections, defines an area for the sliding receipt of filter 26. The filter is engaged with the respective channel portions by aligning the end of the filter in registration with the channel portions and then sliding the filter across the air flow passageway.

FIG. 3 is an identical view to that of FIG. 2 with the filter channels shown in position to promote the connection of the unit to a duct. In this position it may be seen that fasteners 49 extend through the extension openings in the extension portions of the filter channels such that the filter assembly is displaced from the position in FIG. 2 relative to the top portion of the unit casing. In this position it may be seen that flange portions 42 extend upwardly beyond top portion 34 such that the duct may be easily connected thereto.

FIG. 4 is a perspective view of a portion of the casing 30 and filter channel 40. It may be seen that casing 30 includes a front portion 32 and includes a top portion 34 bent at right angles to the front portion. Extending across a part of the length of top portion 34 and angled inwardly therefrom is support portion 36. Filter channel 40 is shown having flange portion 42, extension portion 46 and channel portion 48. Flange opening 45 within flange portion 42 and extension opening 47 within extention portion 46 are additionally shown. It may be seen that the filter channel assembly is displaced vertically to align the appropriate opening to secure the filter channel in the selected position.

Figure 5:
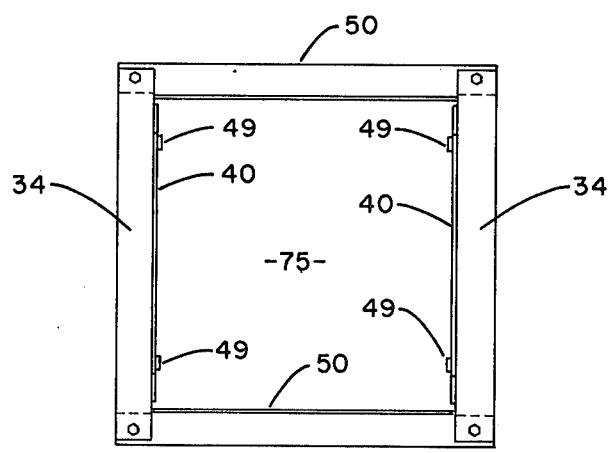
FIG. 5 is a top view of an air handling unit.

Referring now to FIGS. 5 through 7, it may be seen that duct angle 50 may be additionally provided to complete the unit. As shown in FIG. 5, it may be seen that top portions 34 extend parallel to each other on opposite sides of the unit. At the ends of top portions 34 are connected duct angles 50, one at each side of unit to complete the definition of air flow passageway 75 therebetween. Additionally, it may be seen in FIG. 5 that filter channels 40 are connected with fasteners 49. At the two sides of the unit where the filter channels are not mounted it may be seen that duct angle 50 includes a base 52 and an upwardly extending flange 54. Hence, upwardly extending flange 54 as well as flange portions 42 of the filter channel all extend upwardly defining air flow passageway 75 as well as acting to receive the duct to be connected thereto. FIG. 6 is a perspective view of duct angle 50 showing base portion 52 and an upwardly extending flange 54. FIG. 7 is a cross-sectional view of FIG. 6 taken at line VII—VII and more particularly pointing out the relationship of the two.

During assembly of the air handling unit at the factory, when it is not known whether or not duct connections will be made, the filter channels are secured with fasteners 49 through flange opening 45 to support portion 36 of the casing. In this position, the filter channel does not extend beyond top portion 34 defined by casing 30. Additionally, within the factory, duct angles 50 are assembled to the unit as shown in FIG. 5. Since the top portion 34 defines the end of the unit the duct angles 50 are mounted such that flanges extend downwardly and inwardly into the unit similarly to support portions 36 and consequently top portion 34 defines the end of the unit.

Should it become desirable in the field to attach a duct to the unit then the fasteners 49 are removed and the entire filter channel and filter assembly moved upwardly such that fasteners 49 are reinserted through extension openings 47 to provide the flange portions 42 of the filter channels extending upwardly beyond top portion 34. Additionally, duct angles 50 are removed and inverted such that flange 54 of the duct angles extend upwardly rather than downwardly. Consequently four upwardly extending flanges are provided for promoting the connection of the duct to the unit.

The invention has been described herein with reference to a particular embodiment. It is to be understood by those skilled in the art that modifications and variations can be effected within the spirit and scope of the invention.

What is claimed is:

1. An air handling unit, filter support and flange assembly for both securing a filter across an air flow stream and for selectively providing duct flanges for securing a duct thereto which comprises:
   casing means having a plurality of side walls forming a passage for the air flow stream;
   a support portion extending inwardly from the side walls;
   a pair of filter channels positioned within the casing means on opposite sides of the passage for the air flow stream, each filter channel including a flange portion and a channel portion for the sliding receipt of a filter;
   means to secure the filter channels to the support portion in a first position wherein the flange portion does not extend outwardly beyond the support portion and in a second position wherein the flange portion extends beyond the support portion whereby a duct receiving flange is provided; and
   at least one duct angle secured to the support portion and extending perpendicular to the filter channels, said at least one duct angle including an extending flange.

2. The assembly as set forth in claim 1 wherein the at least one duct angle is secured to the support portion by securing means by which the at least one duct angle may be mounted with the flange extending outwardly of the casing means to coact with the flange portions of the filter channels to provide duct receiving flanges or may be mounted with the flange extending inwardly of the casing means such that the flange does not project beyond the support portion.

3. An air handling unit for use in an air conditioning system which comprises:
   a casing defining an air flow path therethrough, said casing including a top portion which extends along two sides of the unit defining an end of the unit and an air flow passageway therethrough and a support portion extending inwardly from the top portion and further limiting the air flow passageway;
   a pair of filter channels mounted within the casing to the support portion of the casing one each on opposite sides of the air flow passageway, said filter channels each having a flange portion and a channel portion;
   a filter secured across the air flow passageway defined by the casing, said filter being slidably received in the channel portions of the filter channels; and
   duct angles are mounted between the top portion at the ends thereof to further define the air flow passageway.

4. The unit as set forth in claim 3 wherein the duct angles include a flange and wherein the duct angles are secured to the support portion by securing means by which the duct angles may be mounted in a first position with the flange extending inwardly of the casing and in a second position with the flanges extending outwardly of the casing to coact with the flange portions of the filter channels providing duct receiving flanges.

* * * * *